Nov. 3, 1942.    P. I. NAGLE    2,300,687
FLUID IMPELLING DEVICE
Filed March 24, 1941    2 Sheets-Sheet 1
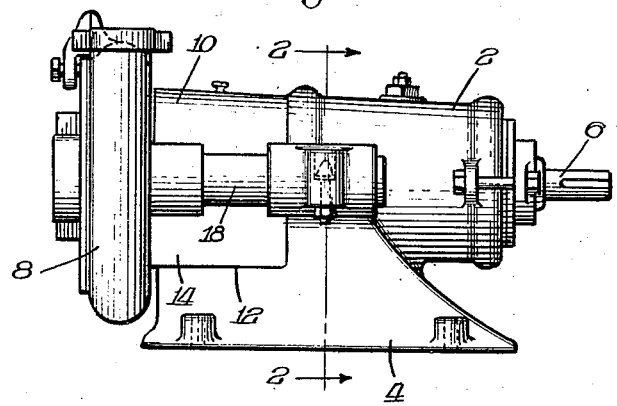
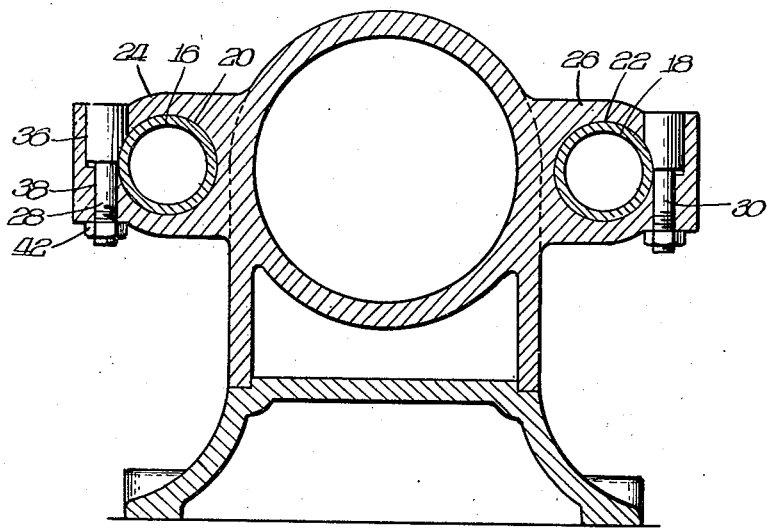
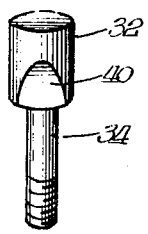
INVENTOR.
Perry I. Nagle Nov. 3, 1942.                P. I. NAGLE                2,300,687
                       FLUID IMPELLING DEVICE
                       Filed March 24, 1941          2 Sheets-Sheet 2

INVENTOR.
Perry I. Nagle
BY Wilkinson Huxley, Byron & Knight
attys.

Patented Nov. 3, 1942

2,300,687

UNITED STATES PATENT OFFICE 2,300,687

FLUID IMPELLING DEVICE

Perry I. Nagle, Chicago Heights, Ill., assignor to The American Brake Shoe and Foundry Company, New York, N. Y., a corporation of Delaware Application March 24, 1941, Serial No. 384,808

9 Claims. (Cl. 103—87)

The present invention relates to fluid impelling devices, and more in particular to novel means for adjusting and aligning certain component parts thereof.

Among the objects of the present invention is to provide novel structure for fluid impelling devices embodying means for adjustably positioning certain parts with respect to one another and to provide for their proper alignment.

Still another object within the purview of the present invention is to provide novel structure in fluid impelling devices whereby the fluid end of the said devices can be easily and readily adjusted and properly aligned with respect to the bearing stand assembly and the impeller therefor.

The invention also contemplates the idea of providing a novel assembly of the parts of fluid impelling devices whereby the fluid end of the said devices is supported in cantilevered relation to a bearing stand assembly or the like and is properly aligned with other parts of the devices, yet providing sufficient clearance for access to the gland or packing structure for the impeller shaft. Such an assembly including the provision of this clearance space prevents destruction of the various parts of the devices because of leakage which may occur at the packing or gland, and particularly so where erosive fluids and the like are being impelled by the said devices.

More particularly, a further object of the present invention is to provide a novel assembled relationship between the fluid end or impeller housing of the said devices and the bearing stand assembly whereby the impeller housing is adjustably positioned by novel means adapted to secure the assembly in cantilevered relation to the bearing stand assembly, such means being constituted by positioning and aligning elements secured to one of said assemblies slidably received within bearings provided on the other of said assemblies and adjustably secured in position by clamping bolts or the like.

The invention as immediately above characterized may be embodied in fluid impelling devices either of the horizontal or vertical type, it being understood, of course, that the bearing stand assembly in the former structure provides means for supporting the impeller driving shaft in a substantially horizontal operating position, whereas in the latter structures the bearing stand assembly may be constituted as a floor plate or the like supporting the fluid impelling device and having the vertical shaft operatively mounted with respect to said floor plate or the like; the adjustment provided in each instance, however, being to properly position the impeller housing with respect to the impeller not only when the device is initially assembled, but also after wear takes place on either or both the impeller and its housing, which requires further adjustment to provide for efficient operation of the said device.

Other objects, features, capabilities and advantages are comprehended by the invention, as will later appear and as are inherently possessed thereby.

Referring to the drawings:

Figure 1 is a view in side elevation of a fluid impelling device embodying structure formed in accordance with the present invention;

Figure 2 is a transverse sectional view taken in the plane represented by line 2—2 of Figure 1 of the drawings;

Figure 3 is a detached view in perspective of a clamping bolt used in the assembly of Figures 1 and 2 for adjustably securing the fluid end of the device in aligned and properly adjusted relation to the bearing stand assembly thereof;

Figure 4:
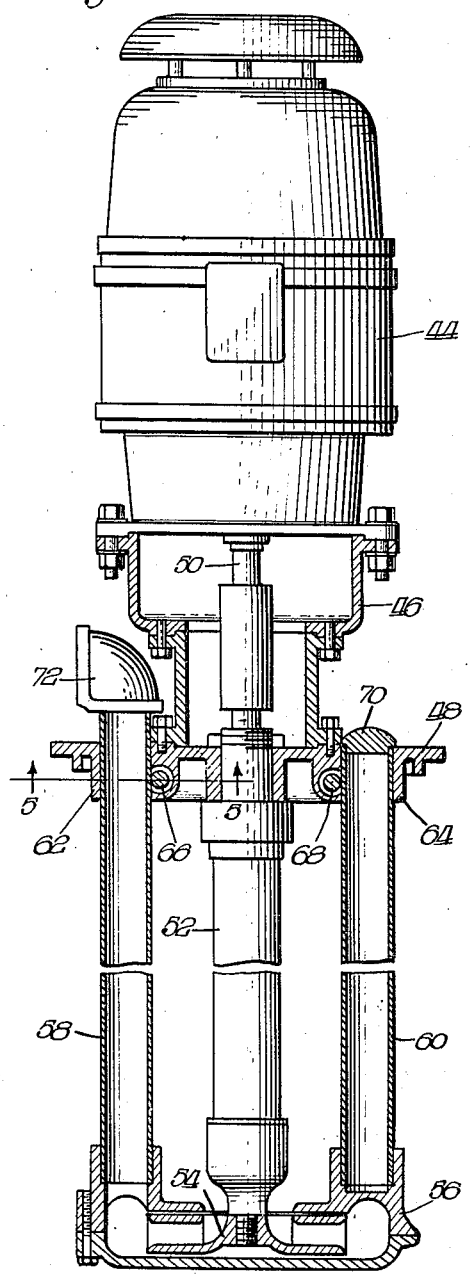
Figure 4 is a view partly in elevation and partly in section of a slightly different type of fluid impelling device than shown in Figures 1 and 2, but incorporating, however, novel features of construction according to the present invention.

Referring now more in detail to the drawings, a fluid impelling device embodying novel structure made in accordance with the present invention is disclosed as a centrifugal pump comprising a bearing stand assembly including a bearing housing 2 and a base or pedestal 4 preferably integrally formed therewith and which provides a suitable support or stand assembly for the entire device. The bearing housing 2 is adapted to receive a bearing cartridge, all in accordance with the disclosure in application Serial No. 384,806, filed March 24, 1941, for mounting an impeller shaft 6 in operative association therewith and which extends horizontally beyond the bearing housing 2 and is provided with an impeller mounted thereon enclosed by the impeller housing assembly 8, all as shown in Figure 1 of the drawings. Associated with the impeller shaft 6 adjacent the housing assembly 8 is a gland or packing structure which may conform to the disclosure of the above identified application, but which is not shown herein, the same, however, being enclosed by the housing 10 extending between the bearing housing 2 and impeller housing 8.

The bearing stand assembly is provided with an offset part or platform 12 laterally of the impeller housing 8 and beneath the packing or gland mechanism to provide clearance whereby access to the gland or packing mechanism can be readily and easily gained for adjustment or replacement of any parts thereof. This clearance space above the offset part or platform 12 may be utilized to provide for a container for receiving fluids which may leak from the packing or gland mechanism and may further be provided with a removable housing, such as 14, for enclosing this part of the fluid impelling structure. The provision of this clearance space by way of the offset or platform 12 to avoid destruction of the operating parts of the pump which might otherwise occur, particularly where corrosive fluids are being pumped by the device, has been instrumental in bringing about novel changes for a device of the type herein disclosed for properly and adequately supporting the impeller housing 8 with respect to the bearing stand assembly.

According to the present invention, the impeller housing has fixed thereto opposed cylindrical-shaped positioning elements 16 and 18 extending therefrom in substantially parallel relation to its axis and which positioning elements are adapted to be slidably received within the openings 20 and 22 of bearings 24 and 26, respectively, which are formed integrally with the bearing stand assembly 2 laterally and above the offset or platform 12 so as not to interfere with the clearance space below the gland or packing mechanism. These openings or bores 20 and 22 provided in the bearings have substantial extended bearing surfaces cooperating with the positioning and aligning elements 16 and 18 to provide for proper aligning and positioning of the impeller housing assembly 8 with respect to the other elements of the device. These extended bearing surfaces also provide ample cooperative bearing relation with the positioning elements extending from the impeller housing assembly so as to properly position the impeller housing assembly in cantilevered relation to the bearing stand assembly and in proper operative relation to the impeller, thus providing a novel arrangement for positioning the impeller housing without interfering in any way with the clearance space above the offset or platform 12 provided to assure non-destruction of any of the parts of the device due to leakage of certain fluids through the gland or packing mechanism.

Relative axial adjustment of the impeller housing assembly 8 and the impeller is effectively provided by the slidable embracing relation of the bearings 24 and 26 to the positioning elements 16 and 18, and such axial positioning and adjustment are secured and maintained by the clamping bolts 28 and 30. The said clamping bolts are each formed with an enlarged head 32 and a threaded extension or shank 34 of less diameter adapted to be received, respectively, in the enlarged transverse bore 36 and the bore 38 of less diameter extending transversely through the bearings 24 and 26 and which enlarged bores communicate with the openings provided in said bearings. When these clamping bolts are in the position as shown in Figure 2, a cam surface 40 provided adjacent the inner end of the enlarged head 32 of the bolts and conforming substantially to the contour of the positioning elements 16 and 18 engages the same whereby, when the said bolts are tightened by nuts 42 threaded on the shank end thereof, the said positioning elements are held in fixed relation to the bearings to properly maintain the impeller housing assembly 8 in operative position with respect to the impeller enclosed thereby. This form of mounting provides for ready adjustability of the impeller housing assembly 8 with respect to the impeller and properly aligns the said impeller housing assembly with the bearing housing 2 in any of the said adjusted positions. Repair or replacement of the impeller housing assembly 8 can be effected readily and easily by loosening the clamping bolts and withdrawing the positioning elements from the bearings.

While the present invention is particularly adapted for use in centrifugal pumps of the horizontal type, such as shown in Figures 1 and 2 of the drawings, nevertheless such novel clamping and adjusting means as has been disclosed and described in connection with this type of pump can be readily used in centrifugal pumps or other similar fluid impelling devices of the vertical type, such as disclosed in Figures 4 and 5 of the drawings. In this modified assembly embracing the present invention, said device includes a motor 44 mounted upon a stand assembly 46 including a floor plate 48 adapted to position the fluid end of the device with respect to a pit, sump or the like. The said motor has a drive shaft 50 adapted to extend downwardly through the floor plate 48 and is operatively mounted with respect thereto by way of a bearing housing assembly 52 which may be suitably mounted with respect to the floor plate 48. This drive shaft 50 has mounted at its end an impeller 54 enclosed by an impeller housing assembly 56 which, in the present illustration, is aligned with and adjustably supported by the positioning elements 58 and 60 of hollow construction and which are received in the openings of bearings 62 and 64, respectively, formed in the floor plate 48 to provide substantial extended bearing relation with the said positioning elements 58 and 60.

Figure 5:
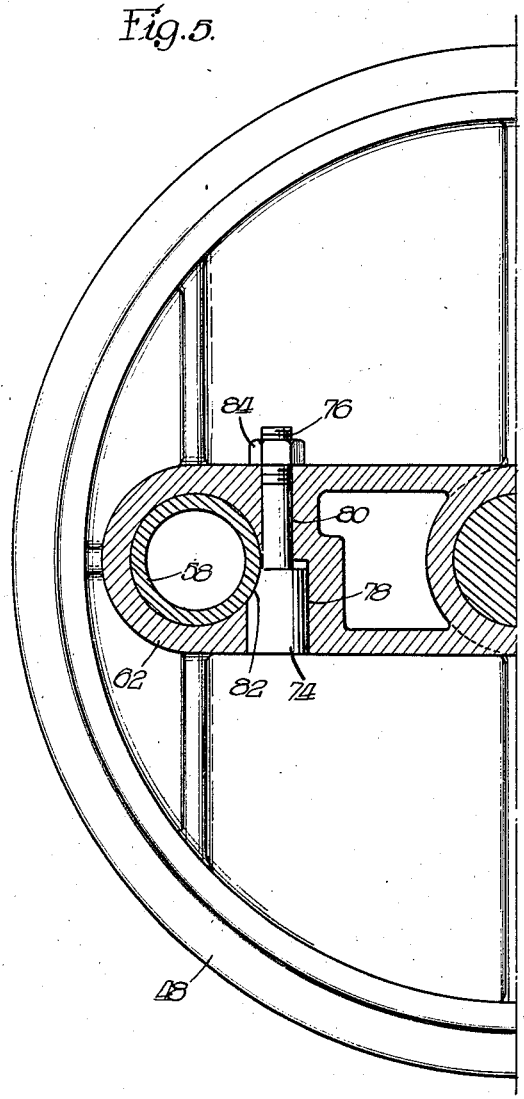
Figure 5 is an enlarged view partly in section and partly in plan taken in the plane represented by line 5—5 of Figure 4 of the drawings.

The said positioning elements 58 and 60 are slidable within said bearings 62 and 64 for adjustably positioning the impeller housing assembly 56 with respect to the impeller 54 and are secured in any of said adjusted positions by means of clamping bolts 66 and 68, both of which are of similar construction and, as shown in Figure 5 of the drawings, are formed with an enlarged head 74 and a threaded shank 76 of less diameter adapted to be received in the transverse bores or recesses 78 and 80, respectively, provided in the bearings for the positioning elements. Each of said bores or recesses 78 communicates with the opening through the bearing which receives the positioning element whereby the cam surface 82 formed at one end of the enlarged head 74 of the clamping bolt may engage the positioning element to secure the same in association with its bearing upon tightening of a nut 84 threaded to the shank of the said bolt. In this respect, the clamping mechanism conforms to that shown in Figures 1, 2 and 3 of the drawings except that the arrangement is somewhat different to accommodate somewhat different structural requirements for this particular type of impeller. When these clamping bolts are tightened, all in accordance with the previous description in connection with Figures 1 and 2 of the drawings, the positioning elements 58 and 60 are secured in operative relation to the floor plate assembly 48.

While in this embodiment the upper end of the hollow tubular positioning element 60 is closed by cap 70, the hollow positioning member 58 is made use of to provide a fluid passage communicating at its lower end with the discharge end of housing assembly 56 and at the other end with a fitting 72 which is connected with a fluid conduit whereby fluid being pumped by the impeller therethrough is discharged to any desired location through the conduit connected with the fitting 72.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. In a fluid impelling device, the combination of a bearing stand assembly having a vertical offset adjacent one side thereof, an impeller shaft mounted in said stand assembly and having an impeller mounted thereon adjacent said offset and to the side of said stand assembly, a housing assembly for said impeller, packing means for said shaft disposed between said assemblies above said offset, and means or adjustably mounting said housing assembly in cantilevered relation to said bearing stand assembly and to provide clearance between said packing means and said offset whereby said housing assembly can be adjusted axially with respect to said impeller.

2. In a fluid impelling device, the combination of a stand assembly, an impeller shaft operatively mounted with respect to said stand assembly and having an impeller mounted thereon, an housing assembly for said impeller, one of said assemblies having bearing sockets formed with substantial bearing surfaces, positioning elements connected to the other of said assemblies and adapted to be adjustably and telescopically received in said bearing sockets and having substantial bearing relation with the bearing surfaces thereof for mounting said impeller housing assembly with respect to said stand assembly independently of said impeller, and means mounted in said one of said assemblies engageable with said positioning elements for adjustably securing the same with respect to said one of said assemblies with said substantial bearing relation between said elements and bearing sockets whereby said impeller housing assembly is rigidly and adjustably aligned with respect to said impeller.

3. In a fluid impelling device, the combination of a stand assembly, an impeller shaft operatively mounted with respect to said stand assembly and having an impeller mounted thereon, an housing assembly for said impeller, said assemblies having bearing sockets formed with substantial bearing surfaces, positioning elements fixed in the bearing sockets of one of said assemblies and being adapted to be adjustably and telescopically received in the bearing sockets of the other of said assemblies and having substantial bearing relation with the bearing surfaces thereof for mounting said impeller housing assembly with respect to said stand assembly independently of said impeller, and means mounted in said other of said assemblies engageable with said positioning elements for adjustably securing the same with respect to said other of said assemblies with said substantial bearing relation between said elements and bearing sockets whereby said impeller housing assembly is rigidly and adjustably aligned with respect to said impeller.

4. In a fluid impelling device, the combination of a stand assembly, an impller shaft operatively mounted in horizontal relation with respect to said stand assembly and having an impeller mounted thereon, an housing asembly for said impeller, one of said assemblies having bearing sockets disposed laterally of said shaft and being formed with substantial surfaces, positioning elements connected to the other of said assemblies and adapted to be adjustably and telescopically received in said bearing sockets and having substantial bearing relation with the bearing surfaces thereof for mounting said impeller housing assembly with respect to said stand assembly independently of said impeller, and means mounted in said one of said assemblies engageable with said positioning elements for adjustably securing the same with respect to said one of said assemblies with said substantial bearing relation between said elements and bearing sockets whereby said impeller housing assembly is rigidly and adjustably aligned with respect to said impeller.

5. In a fluid impelling device, the combination of a stand assembly, an impeller shaft operatively mounted in horizontal relation with respect to said stand assembly and having an impeller mounted thereon, an housing assembly for said impeller, said assemblies having bearing sockets disposed laterally of said shaft and being formed with substantial bearing surfaces, positioning elements fixed in the bearing sockets of one of said assemblies and being adapted to be adjustably and telescopically received in the bearing sockets of the other of said assemblies and having substantial bearing relation with the bearing surfaces thereof for mounting said impeller housing assembly with respect to said stand assembly independently of said impeller, and means mounted in said other of said assemblies engageable with said positioning elements for adjustably securing the same with respect to said other of said assemblies with said substantial bearing relation between said elements and bearing sockets whereby said impeller housing assembly is rigidly and adjustably aligned with respect to said impeller.

6. In a fluid impelling device, the combination of a stand assembly, an impeller shaft operatively mounted in horizontal relation with respect to said stand assembly and having an impeller mounted thereon, an housing assembly for said impeller, said stand assembly having bearing sockets formed with substantial bearing surfaces, positioning elements fixed to said impeller housing assembly and being adapted to be adjustably and telescopically received in said bearing sockets and having substantial bearing relation with the bearing surfaces thereof for mounting said impeller housing assembly with respect to said stand assembly independently of said impeller, and means mounted in said stand assembly engageable with said positioning elements for adjustably securing the same with respect to said bearing sockets with said substantial bearing relation between said elements and bearing sockets whereby said impeller housing assembly is rigidly and adjustably aligned with respect to said impeller.

7. In a fluid impelling device, the combination of a stand assembly having a vertical offset adjacent one side thereof, an impeller shaft operatively mounted in horizontal relation with respect to said stand assembly at one side of said offset and having an impeller mounted thereon at the other side of said offset, an housing assembly for said impeller, said assemblies having bearing sockets disposed above said offset and formed with substantial bearing surfaces, positioning elements fixed in the bearing sockets of one of said assemblies and being adapted to be adjustably and telescopically received in the bearing sockets of the other of said assemblies and having substantial bearing relation with the bearing surfaces thereof for mounting said impeller housing assembly with respect to said stand assembly independently of said impeller, and means mounted in said other of said assemblies engageable with said positioning elements for adjustably securing the same with respect to said other of said assemblies with said substantial bearing relation between said elements and bearing sockets whereby said impeller housing assembly is rigidly and adjustably aligned with respect to said impeller.

8. In a fluid impelling device, the combination of a stand assembly having a vertical offset adjacent one side thereof, an impeller shaft operatively mounted in horizontal relation with respect to said stand assembly at one side of said offset and having an impeller mounted thereon at the other side of said offset, an housing assembly for said impeller, said stand assembly having bearing sockets disposed above said offset and formed with substantial bearing surfaces, positioning elements fixed to said impeller housing assembly and being adapted to be adjustably and telescopically received in said bearing sockets and having substantial bearing relation with the bearing surfaces thereof for mounting said impeller housing assembly with respect to said stand assembly independently of said impeller, and means mounted in said stand assembly engageable with said positioning elements for adjustably securing the same with respect to said bearing sockets with said substantial bearing relation between said elements and bearing sockets whereby said impeller housing assembly is rigidly and adjustably aligned with respect to said impeller.

9. In a fluid impelling device, the combination of a stand assembly having a vertical offset adjacent one side thereof, an impeller shaft operatively mounted in horizontal relation with respect to said stand assembly at one side of said offset and having an impeller mounted thereon at the other side of said offset, an housing assembly for said impeller, one of said assemblies having bearing sockets disposed above said offset and formed with substantial bearing surfaces, positioning elements connected to the other of said assemblies and adapted to be adjustably and telescopically received in said bearing sockets and having substantial bearing relation with the bearing surfaces thereof for mounting said impeller housing assembly with respect to said stand assembly independently of said impeller, and means mounted in said one of said assemblies engageable with said positioning elements for adjustably securing the same with respect to said one of said assemblies with said substantial bearing relation between said elements and bearing sockets whereby said impeller housing assembly is rigidly and adjustably aligned with respect to said impeller.

PERRY I. NAGLE.